United States Patent Office 3,375,927
Patented Apr. 2, 1968

3,375,927
METHOD OF INCREASING THE CAPACITY OF HORIZONTAL ROTARY VACUUM FILTERS
Edwin B. Lopker, 7F Dupont Towers East, 5100 Dupont Blvd., Fort Lauderdale, Fla. 33308
No Drawing. Filed May 15, 1967, Ser. No. 638,622
1 Claim. (Cl. 210—67)

ABSTRACT OF THE DISCLOSURE

A method for increasing the capacity of a horizontal rotary vacuum filter having at least one filter area which rotates about a center comprising carrying out a plurality of complete filtration cycles during each revolution of the filter area including feeding a slurry to be filtered to the filter area at N number of points in the path of the filter, vacuum filtering the slurry to produce a filter cake, and removing the filter cake remaining after filtration at N number of points in the path of the filter, the non-active area of the filter being that area where removal of the filter cake from the filter area is accomplished and not exceeding in percent of total filter area for each filtration cycle the resultant of $$\frac{100\%}{N+1}$$

N being greater than 1, whereby the capacity of the filter is increased in percentage increase of slurry up to $(100\sqrt{N}-100)\%$, assuming a theoretical 0% non-active area.

---

This invention relates to horizontal rotary vacuum filters and more particularly to filters of the type which are commercially known as tilting-pan or "Prayon" filters and to filters of the horizontal table type such as the commercially known "UCEGO" filters. In accordance with this invention a method has now been surprisingly discovered which enables increased production from filters of these types. The increase in productive capacity obtained by the application of the method of this invention is independent of the vacuum applied to the filter, independent of the speed of rotation of the filter and independent of the filtration characteristics of the slurry of solids and liquids charged to the filter. By this it is meant that the increase in productive capacity may be obtained even though no change is made in the vacuum applied to the filter, no change is made in the speed of rotation of the filter and with slurry charged to the filter which has the same filtration characteristics.

In brief, the method of this invention provides for carrying out more than one complete filtration cycle on the filter during the course of each revolution of the filter. By a complete filtration cycle is meant the total cycle from the charging of slurry to the discharge of the filter cake from the filter including, if desired, one or more applications of wash liquids to the filter cake on the filter during the filtration cycle.

There are certain relationships which control the productive capacity of filters of these types and these relationships, which may be expressed mathematically, have been confirmed by experimental laboratory work and by the operation of commercial filters. A first relationship, which applies exactly only to filter cakes which are not compressible under the differential pressure caused by the application of vacuum, is that, other factors remaining constant, the filtration cycle time is inversely proportional to the applied vacuum. Most filter cakes are at least slightly compressible and the relationship is altered accordingly. However, since the application of this invention is not concerned with effects due to changes in vacuum further reference to this relationship will not be made. A second relationship is that, other factors remaining constant, the filtration cycle time is directly proportional to the square of the cake thickness and a third relationship is that the productive capacity is inversely proportional to the square root of the filtration cycle time. It is with these latter two relationships that this invention is concerned.

In applying the method of this invention there is a limiting factor to the number of cycles permissible in order to gain an increased capacity. This limiting factor is the percentage of the total filter area which is not active filtration area. This non-active area (insofar as filtration is concerned) is necessary to remove the filter cake and prepare the filter surface for receiving a new charge of slurry. In the case of "Prayon" type filters, this is the time required during each revolution of the filter to invert the filter pans and discharge the filter cake and return the pans to normal upright position ready to receive a new charge of slurry. This operation may also include time to wash the filter media, cloth drying, etc. The time for all of these operations, during which filtration is not being carried on, divided by the total time per revolution of the filter is the non-active percentage of the total area referred to above. It will be understood that in the case of table filters of the "UCEGO" type where the filter cake is removed by a scroll a similar non-active percentage of total filter area is referred to.

It can be shown that the maximum limiting percentage of non-conductive area for each filtration cycle of a filter may be expressed as $$\left(\frac{100}{N+1}\right)$$

where N is the number of complete filtration cycles (greater than one) carried out during each revolution of the filter. The expression $$\left(\frac{100}{N+1}\right)$$

equals 33⅓% for the case in which two complete filtration cycles are carried out during each revolution of the filter. With constant conditions, i.e., no change in vacuum, speed of rotation of the filter or filtration characteristics of the slurry, a filter with one-third non-active area will have the same productive capacity whether one or two filtration cycles are carried out for each revolution of the filter. If one filtration cycle is carried out the thickness of the cake will be a certain figure, depending upon filtration characteristics of the slurry being filtered, the vacuum applied, the speed of rotation, etc. The useful filtration area is ⅔ of the total filter area. With two filtration cycles per revolution on this same filter, however, ⅔ of the total area will become non-active and two sections, each comprising only ⅙ of the total area of the filter will be available for filtration. But since the filter cake is removed twice for each revolution of the filter it will only need to be ½ as thick to provide the same productive capacity; and with ½ the thickness the filtration cycle is four times as fast or, for the same capacity, requires only ¼ as much area; and ¼ of the ⅔ area required for one filtration cycle equals ⅙ of the total area. This is then the area available per cycle when two cycles per revolution are used. It may similarly be shown that the maximum percentages of non-active area, at which no productive capacity gain is realized, is 25% for three filtration cycles per revolution, 20% for four filtration cycles per revolution, etc.

It will be obvious that the minimum percentage of non-active area is desirable and it may be shown that 0% non-active area, assuming a theoretical 0% non-active area since this is not attainable in practice, would result in percentage productive increases indicated by the expression $(100\sqrt{N}-100)$ where N is again the number of filtration cycles per revolution of the filter. The maximum theoretical increases would therefore be 41% for two filtration cycles per revolution of the filter, 73% for three cycles, 100% for four cycles, etc.

The principles of this invention may be illustrated by the following example as applied to a commercial filter of the "Prayon" type as described in detail in U.S. Patent 2,684,158. The filter has a total area of 700 square feet and an active filtration area of 600 square feet. The percentage of non-active area is therefore $100/700$ or about 14%. When two filtration cycles per revolution are applied to this filter, the productive capacity is increased by about 30% even though 28% of the filter area is now non-active. Applying three filtration cycles per revolution increases the productive capacity about 40% even though 42% of the filter area is non-active. These gains in capacity are obtained solely by applying the principles of this invention; the vacuum applied to the filter, the filter's speed of rotation and the filtration characteristics of the slurry being filtered all remain the same.

It is claimed:
1. A method for increasing the capacity of a horizontal rotary vacuum filter having at least one filter area which rotates about a center comprising carrying out a plurality of complete filtration cycles during each revolution of the filter area including feeding a slurry to be filtered to the filter area at N number of points in the path of the filter, vacuum filtering the slurry to produce a filter cake, and removing the filter cake remaining after filtration at N number of points in the path of the filter, the non-active area of the filter being that area where removal of the filter cake from the filter area is accomplished and not exceeding in percent of total filter area for each filtration cycle the resultant of $$\frac{100\%}{N+1}$$

N being greater than 1, whereby the capacity of the filter is increased in percentage increase of slurry up to $$(100\sqrt{N}-100)\%$$

assuming a theoretical 0% of non-active area.

No references cited.

SAMIH N. ZAHARNA, *Primary Examiner.*